S. W. HOLLEN.

TIME-LOCK.

No. 6,787.

Reissued Dec. 7, 1875.

Witnesses
Henry M. Thomas
H. B. Morrison

Inventor.
Stephen Wm. Hollen,
per R. F. Osgood,
atty.

N. PETERS, Photo-Lithographer, Washington, D. C.

UNITED STATES PATENT OFFICE.

STEPHEN W. HOLLEN, OF CINCINNATI, OHIO, ASSIGNOR TO JAMES SARGENT, OF ROCHESTER, NEW YORK.

IMPROVEMENT IN TIME-LOCKS.

Specification forming part of Letters Patent No. 121,782, dated December 12, 1871; Reissue No. 6,787, dated December 7, 1875; application filed July 9, 1873.

*To all whom it may concern:*

Be it known that I, STEPHEN WILLIAM HOLLEN, of Cincinnati, in the county of Hamilton and State of Ohio, have invented an Improved Combined Time Mechanism and Non-Chronometer Lock, of which the following is a specification.

My invention has for its object to combine a time mechanism with a non-chronometer lock, and effect a union between the two by a lever-connection and a moving dog or bar, in such a manner that said parts will dog or render inoperative the bolt of the non-chronometer lock, and render the same incapable of being unlocked until the time mechanism and its lever-connection has ceased its dogging action upon the bar or dog of the non-chronometer lock, and even then said lock remains locked only to be opened by the authorized person.

My invention consists in the combination of a time mechanism and a non-chronometer lock, with a lever-connection, and a bar or dog, the latter and the said lever-connection being operated by the time mechanism, and said lever being constructed and located to act on the bar or dog, to dog or render the bolt of said lock incapable of being unlocked, when locked, until the arrival of the appointed time, when the time mechanism ceases its dogging action, and admits of the bolt being operated. The invention further consists of the combination of a time mechanism and a non-chronometer lock, each arranged in its own casing with a lever-connection, operated by and extending from the time mechanism into the casing of the non-chronometer lock for holding a bar or dog, for dogging and preventing the bolt of said lock being unlocked, when locked, until a certain predeterminate hour. The invention further consists in combining with a non-chronometer lock a time mechanism, having a lever-connection, operated by said time mechanism for holding a dog or bar, for dogging the non-chronometer lock, with a mechanism for operating the lever-connection, to release the bolt for unlocking, and with a mechanism for automatically stopping the running action of the time movement when the bolt is so released.

Figure 1:
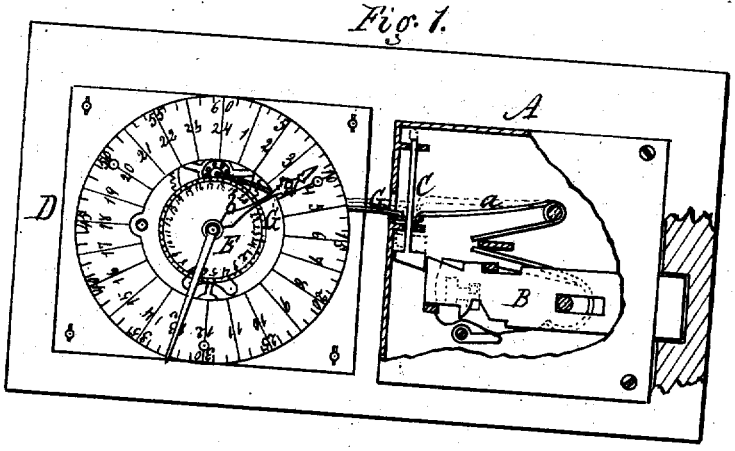
Figure 2:
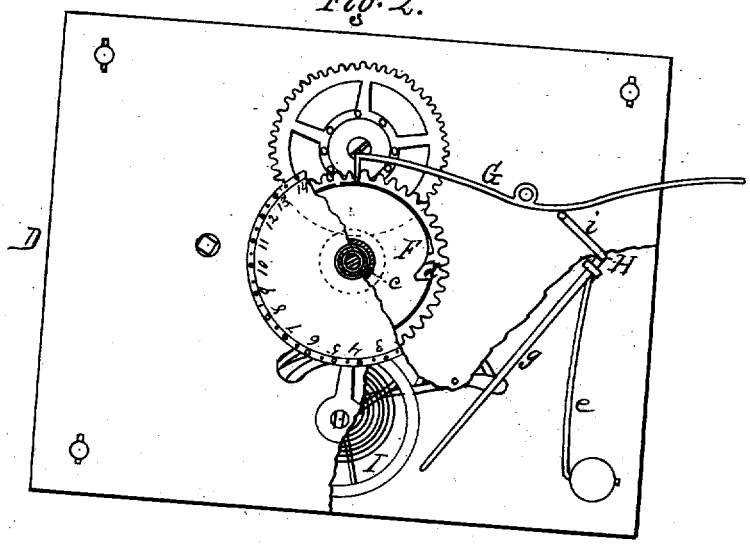

In the drawing, Figure 1 represents the combined time mechanism and non-chronometer lock, with the lever-connection, and a dog or bar, for dogging the non-chronometer lock. Fig. 2 represents a portion of the time mechanism.

In the drawing, A represents a non-chronometer lock, having a locking-bolt, B, and C is a vertical sliding dog or bar, mounted in the back end of the lock in such manner that when the bolt is out the dog or bar can slide down behind it and prevent it from being drawn in or unlocked until the dog is raised. A spring, *a*, is connected with the dog or bar, so as to throw the same up, except when held down, and prevent it from moving by its own weight. D represents a time mechanism, secured in position in proximity to the non-chronometer lock, for the purpose of operating the dog or bar. This time mechanism is constructed in an ordinary manner, except that, as shown, the hour-hand is arranged so as to make one revolution in twenty-four hours instead of twelve, and that the dial is divided into twenty-four divisions to correspond. E is a dial-plate, shown with twenty-four divisions, and is mounted on the shaft or sleeve of the hour-hand, while F is a circular disk, mounted on the hour-hand shaft behind the dial E, and connected to said dial E by a sleeve, *c*, so that both must move together. The dial E and disk are so mounted on the shaft that they can be turned around thereon, while at the same time there is sufficient friction to carry them with the shaft as it revolves. The disk is provided with a notch, *d*, in its edge, and upon the top of the disk there bears one end of a lever-connection, G, which falls into the notch *d*, when the disk is turned, so as to bring it thereunder. The lever-connection is pivoted, and has its forward end arranged to bear on a pin on the side of the moving dog or bar of the lock, so that when its end drops into the notch of the disk the opposite end rises and permits the dog to move and cease its dogging action on the bolt.

When the disk is turned, so as to raise the lever-connection out of the notch, the other end of the said lever-connection moves the dog or bar into contact with the bolt, and prevents the same from being operated. H represents a rock-shaft, provided with an arm, *g*, against which a spring, *e*, bears, and with a crank, *i*, which bears under the outer end of the lever-connection, so that when the end of the said lever-connection permits the spring *a* to move the dog away from the bolt the crank *i* will be allowed to turn, and the spring *e* to press the arm *g* against the balance-wheel of the clock, and stop the same; but when the lever-connection falls to let the dog or bar "dog" the bolt of the non-chronometer lock, it also turns the crank *i*, and lifts the arm *g* from the balance-wheel, so that the time mechanism can operate and set the disk F in motion. The divisions on the time-mechanism face, and on the dial E are numbered from 1 to 24, successively, and the notch in the disk is located immediately behind the last or twenty-fourth space on the small dial. As the dial is turned on its shaft, so as to bring its different numbers under the hour-hand, the notch is, of course, brought into different relative positions to said hand, being at one time under, or in line with, the hand, and at another time on the opposite side of the shaft therefrom. The relative positions of the hand and notch are not, however, changed by the running of the time mechanism, but only by taking hold of the disk, and turning with the fingers.

In order to set the time mechanism, it is only necessary to turn the small dial until the number indicating the required hour is brought under the hour-hand—for example, if it is required to have the non-chronometer lock open at 9 a. m. of the next day, the dial is turned until the number 21 is brought under the hand, as the required hour is the twenty-third one from noon of the previous day, which is indicated by the number 1 on the time-mechanism face. As the hour-hand revolves the disk is carried around with it until the notch comes under the end of the lever-connection, which it will do when the hand reaches the number 21 on the time-mechanism face at 9 o'clock, at which time the lever-connection will be allowed to move, and the dog or bar be operated and stop the time mechanism, so that the non-chronometer lock may be operated by the authorized person.

The lever-connection is made of steel or other flexible material, so that it can yield or bend when its end is raised by the disk, at a time when the bolt of the non-chronometer lock is back, so as to prevent the dog or bar from descending, for in such case said dog or bar will bear on top of the bolt, and prevent the end of the lever-connection from descending. To prevent the lever-connection from being kept in its bent or curved form during the whole time that the bolt of the non-chronometer lock is back, by which the lever-connection would be liable to become permanently bent or set, the lower end of the dog or bar is beveled, and the bolt of the aforesaid lock is provided with a notch or recess to receive the same, the dog or bar being thus allowed to descend almost as far as when it exerts dogging action on the bolt.

When the bolt moves forward the dog or bar moves out of the notch and dogs the bolt of the aforesaid non-chronometer lock.

From the foregoing it will be perceived that a time mechanism is combined with a non-chronometer lock, a union between the two being effected by a lever-connection which is constructed and located to dog or control the action of a bar or dog, to render the aforesaid non-chronometer lock incapable of being unlocked when locked.

Further, it will be perceived that under the invention the works of the time mechanism and the works of the non-chrometric lock are each arranged in its own casing, a union between the two being effected by a lever-connection operated by and extending from the time movement into and through the casing of the non-chronometer lock, by which means the works of the non-chronometer lock can be effectually "dogged" and prevented from being unlocked while the time mechanism is in running action.

Having thus described my invention, what I claim, and desire to secure by Letters Patent, is—

1. The combination of a time mechanism and a non-chronometer lock with a lever-connection operated by the time movement, said lever being constructed and located to hold a bar or dog for dogging the bolt of said lock and render it incapabe of being unlocked, when locked, until the arrival of the appointed time, when the time mechanism ceases its dogging action and admits of the bolt being operated.

2. The combination of a time mechanism and a non-chronometer lock, each arranged in its own casing, with a lever-connection operated by and extending from the time movement and from or through its casing into the casing of the non-chronometer lock, for operating means for preventing the bolt of said lock being unlocked, when locked, until a certain predeterminate time.

3. In combination with a non-chronometer lock, a time mechanism having a lever-connection operated by the time mechanism for dogging the bolt of the non-chronometer lock, with a mechanism for operating the lever to release the bolt for unlocking, and with a mechanism for automatically stopping the running action of the time mechanism when the bolt is so released.

In witness whereof I have hereunto set my hand this 3d day of July, 1873.

STEPHEN W. HOLLEN.

Witnesses:

JAMES H. LAYMAN,
H. SCHOONMAKER.